United States Patent
Mare

(10) Patent No.: US 11,680,389 B2
(45) Date of Patent: Jun. 20, 2023

(54) WASHING UNIT

(71) Applicant: Jeremias Jesajas Jacobus Mare, Witbank (ZA)

(72) Inventor: Jeremias Jesajas Jacobus Mare, Witbank (ZA)

(*) Notice: Subject to any disclaimer, the term of this patent is extended or adjusted under 35 U.S.C. 154(b) by 58 days.

(21) Appl. No.: 17/040,644

(22) PCT Filed: Mar. 26, 2019

(86) PCT No.: PCT/ZA2019/000002
§ 371 (c)(1),
(2) Date: Sep. 23, 2020

(87) PCT Pub. No.: WO2019/191789
PCT Pub. Date: Oct. 3, 2019

(65) Prior Publication Data
US 2021/0017741 A1    Jan. 21, 2021

(30) Foreign Application Priority Data
Mar. 26, 2018  (ZA) .................................. 2018/01971

(51) Int. Cl.
*E03B 1/04*    (2006.01)
*E03C 1/04*    (2006.01)

(52) U.S. Cl.
CPC ............ *E03B 1/041* (2013.01); *E03C 1/0408* (2013.01); *E03B 2001/045* (2013.01)

(58) Field of Classification Search
CPC ...... E03B 1/041; E03B 2001/045; E03C 1/00; E03C 1/0408
See application file for complete search history.

(56) References Cited

U.S. PATENT DOCUMENTS

| | | | | |
|---|---|---|---|---|
| 5,106,493 A | * | 4/1992 | McIntosh | ................... C02F 9/00 |
| | | | | 210/100 |
| 2004/0168992 A1 | * | 9/2004 | Ben-Amotz | ............ E03B 1/042 |
| | | | | 210/167.3 |

(Continued)

FOREIGN PATENT DOCUMENTS

| DE | 4124605 | * | 1/1993 | ............. E03B 1/041 |
|---|---|---|---|---|
| GB | 2 248 390 A | | 4/1992 | |
| WO | WO 2017/111600 A1 | | 6/2017 | |

OTHER PUBLICATIONS

International Search Report with Written Opinion of the International Searching Authority, dated Jun. 4, 2020, with respect to International Application No. PCT/ZA2019/000002.

(Continued)

*Primary Examiner* — J C Jacyna
(74) *Attorney, Agent, or Firm* — Scott R. Cox

(57) ABSTRACT

A passive water-and-energy saving washing unit is provided having a first shower sub-assembly and a second shower sub-assembly. The first shower sub-assembly comprises a first water reservoir, for holding a predetermined volume of water for washing at least part of a body, a water heater, for heating water for the first water reservoir, and a shower head, in fluid communication with the first water reservoir for receiving water from the reservoir and providing water spray on the body part. The second shower sub-assembly comprises a second, grey water reservoir, for collecting the sprayed water from the first shower head and running off the body part, a shower head, in fluid communication with the second water reservoir for receiving the water from the reservoir and providing water spray on the body part, and a water pump, for pumping the water from the second water reservoir to the second shower head. A corresponding kit and a method for washing at least part of body with a washing unit are also provided.

17 Claims, 2 Drawing Sheets

(56) References Cited

U.S. PATENT DOCUMENTS

Figure 1:
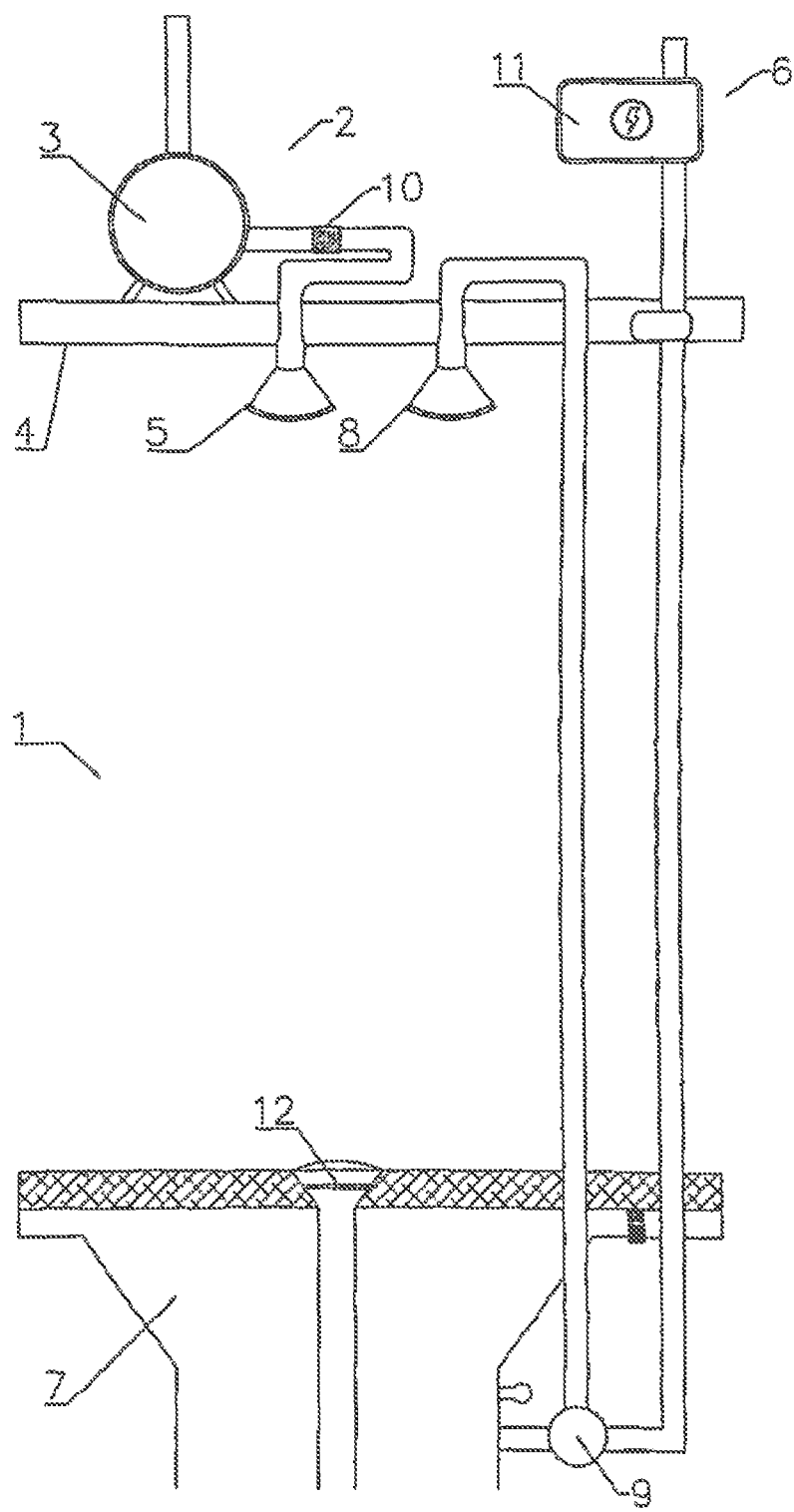

| | | | |
|---|---|---|---|
| 2006/0260042 A1* | 11/2006 | Eveleigh | A61H 35/02 |
| | | | 4/620 |
| 2011/0289672 A1 | 12/2011 | Cummings | |
| 2014/0053909 A1* | 2/2014 | Savage | E03B 1/041 |
| | | | 137/563 |
| 2017/0321398 A1* | 11/2017 | Ellerby | E03B 7/045 |
| 2017/0356172 A1* | 12/2017 | Searcy | E03C 1/0408 |
| 2018/0201516 A1* | 7/2018 | Mahdjoubi Namin | ...... |
| | | | E03C 1/0408 |
| 2019/0003157 A1* | 1/2019 | Greidanus | E03C 1/00 |
| 2019/0003158 A1* | 1/2019 | De Jong | E03B 1/041 |

OTHER PUBLICATIONS

Article published 2011 "Use your head and start saving Changing to an energy efficient shower head can save you water, electricity and money every month!" by South African Power Utility, Eskom.

\* cited by examiner

WASHING UNIT

FIELD OF THE INVENTION

The invention relates to a passive washing unit and, more particularly, to a passive water-and-energy saving washing unit suitable for washing human and animal bodies, including parts thereof only, such as hands, scalp, hair and furs in showers, basins, hair salons, barbers, animal parlours and the like.

BACKGROUND TO THE INVENTION

It is estimated that an average household of about 4 members consumes between 200 and 300 litres of potable water daily, the bulk of which is consumed during the so-called non-fat activities of showering and bathing, and all of which flows typically unrecycled down gullies into urban waste water systems. About 40% of an average household's total indoor water consumption is estimated to be used in the shower alone.

According to figures published in 2011 by the South African Power utility, Eskom, it is estimated that a reduction in shower time to 7 minutes per shower, at a geyser setting of about 60° Celsius, together with a reduction in water flowrate from about 20 litres/minute to about 8 litres/minute, could save up to about 35 litres of water per shower and the corresponding energy that required to heat such shower water. Related published figures estimate that average South African households utilise up to 40% of their monthly electricity consumption on water heating.

Various systems, devices and methods for saving water and/or energy, in the form of heat or electricity, to warm up washing water, are known and form part of the prior art.

Some of the existing water saving systems, devices and methods reduce or restrict water flow, while others utilise waste or so-called grey water for secondary applications such as irrigation for gardens or urban vegetation. Some of the energy saving systems, devices and methods include solar water heaters and heat pumps, while energy saving shower heads reduce the water rate while improving the effectiveness of the water jets, as part of the washing experience during such water and/or energy saving exercises.

The use of at least some of the waste or grey water generated during domestic activities such as showers, baths, bathroom sinks and laundry washing machines in relatively dry regions such as Southern Africa has accordingly become common practice, if not a necessity, as such grey water typically contains no inorganic contaminants that could be harmful to humans, animals, fauna or flora, and contains no organic contaminants, such as those commonly generated during kitchen activities, that could cause health hazards.

However, very little, if any, of the existing systems, devices and methods recycle grey water for human or animal usage such as for body washing purposes.

For purposes of this specification:
the term "grey water" shall hereinafter be interpreted as to include waste water from non-fat activities that are suitable for human or animal usage such as for body washing purposes;
the term "body part" shall hereinafter be interpreted as to include a human or animal body, and any part thereof, such as a human body, like that being washed in a domestic or public shower, a head, scalp or hair, like that being washed and/or rinsed at hair solons, barbers and the like, or a fur, like that being washed and/or rinsed at animal parlours and the like; and
the term "passive system" shall hereinafter be interpreted as to refer to washing systems, including washing units, that are arranged to heat up ambient water shortly prior to washing only, so as to minimize the energy required to heat the water, and that are therefore distinguishable from so-called active systems, such as conventional washing units, wherein geysers are commonly arranged to retain the water at preselected temperatures in anticipation of potential usage in future.

OBJECT OF THE INVENTION

It is accordingly an object of the present invention to provide a novel, relatively inexpensive, passive water-and-energy saving washing unit and a method for washing therewith.

SUMMARY OF THE INVENTION

According to a first aspect of the invention there is provided a passive water-and-energy saving washing unit including:
 a first washing sub-assembly, comprising a first water reservoir, for holding a predetermined volume of water for washing at least part of a body, a water heater, for heating water for the first water reservoir, a first spout, in fluid communication with the first water reservoir for receiving water from the reservoir and providing washing water to the body part; and
 a second washing sub-assembly, comprising a second, grey water reservoir, for collecting the discharged water from the first spout, a second spout, in fluid communication with the second water reservoir for receiving the water from the reservoir and providing washing water to the body part, and a water pump, for pumping the water from the second water reservoir to the second spout.

The washing unit may be arranged in the form of a human shower, the first and the second washing sub-assemblies being arranged in the form of a first and a second shower sub-assembly, with the spout being in the form of a shower head for spraying washing water onto a human body.

The washing unit may include a first control mechanism, for controlling the water flow between the first water reservoir and the first shower head, and a second control mechanism, for controlling the water flow between the second water reservoir and the second shower head, with the assistance of the pump, once the second water reservoir has collected a predetermined volume of grey water therein.

The first control mechanism and the second control mechanism may be arranged such that once the second water reservoir has collected the predetermined volume of grey water therein, the water flow between the first water reservoir and the first shower head is cut off and the pump is triggered to pump water from the second water reservoir to the second shower head, from where the water can be sprayed onto the body part and the run-off water can be collected again in the second water reservoir.

The first control mechanism and the second control mechanism preferably may be arranged further such that once the body part has been washed sufficiently or once the water temperature has dropped to below a predetermined or acceptable temperature, the second control mechanism can be triggered to stop the pump and allow the water to discharge from the second water reservoir, thereby terminating the washing process.

Alternatively, the first control mechanism and the second control mechanism preferably may be arranged further such that once the water has been discharged from the second water reservoir, the first control mechanism can be triggered to allow fresh hot water to flow from the first water reservoir to the first shower head, from where it can be sprayed onto the body part and the run-off water can be collected in the second water reservoir.

More preferably, the first control mechanism and the second control mechanism may be arranged further such that once the second water reservoir has collected the predetermined volume of water therein, the water flow between the first water reservoir and the first shower head is cut off again and the pump is triggered to pump water from the second water reservoir to the second shower head, from where the water can be sprayed onto the body part and the run-off water can be collected again in the second water reservoir.

The washing unit may include a third water reservoir, located and arranged in fluid communication between a fresh water supply line and the first reservoir, for holding a predetermined volume of clean (fresh) water for washing the human body (not shown), the third water reservoir being mounted similarly on the elevated support structure; a water heating arrangement (not shown), for heating water for the third water reservoir.

The washing unit may be provided with a single (common) shower head, shared jointly between the first shower sub-assembly and the second shower sub-assembly.

The first water reservoir preferably preheats the water in the reservoir before supplying the pre-heated water to the first reservoir, enabling the first reservoir to maintain the water temperature in it for a predetermined, extended period while providing a constant supply of predetermined heated water to the first shower head from where clean water is sprayed onto the human body (not shown).

The first control mechanism of the washing unit may be located and arranged to control the water flow between the first water reservoir and the joint shower head as well as the water flow between the second water reservoir and the joint shower head, with the assistance of the pump, by means of the second control mechanism.

The washing unit may be modular, capable of being incorporated and arranged in a bank of substantially similar washing units. In these arrangements, the third bulk water reservoir and/or the first reservoir may hold a predetermined volume of clean (fresh) bulk water for washing a plurality of human bodies, with a correspondingly dimensioned and arranged water heating arrangement, for heating a predetermined volume of clean (fresh) bulk water for the third water reservoir for washing such plurality of human bodies.

The washing unit may be dimensioned and configured to reduce any cold or stagnant water pockets as far as reasonably possible so as to optimize the heat retention of the warm water. The distance between the third reservoir and the first reservoir, the distance between the first reservoir and the first shower head, the internal volume of the shower head, the volume of the second reservoir, the distance between the second reservoir and the pump, and the distance between the pump and the shower head, are accordingly preferably dimensioned and configured so as to reduce the distance of water flow and the internal volumes as far as reasonably possible.

Componentry and water conduits used in the washing unit may be selected from materials and/or be insulated as far as reasonably possible so as to reduce any heat loss and optimize the heat retention of the warm water while minimizing the build-up of biofilm therein for sanitary purposes.

The washing unit may be arranged to heat up ambient water in the first water reservoir, alternatively in the first reservoir and the third reservoir, immediately prior to washing only, so as to minimize the energy required to heat the water. The washing unit may include an adjustable timer and/or thermostat setting mechanism as part of the second control mechanism for controlling and/or adjusting the heating time and/or temperature of the water in the first water reservoir, alternatively in the first reservoir and the third reservoir, and hence the temperature and/or duration of the washing process, as required from time to time.

The washing unit may include a water quality sensor, such as for water colour, soapiness, water hardness and the like, as part of the second control mechanism for controlling and/or adjusting the washing process, as required from time to time.

The first shower sub-assembly may comprise a simple manual arrangement, wherein the first water reservoir is merely a vessel capable of being elevated to hold the volume of water, batch-wise, once the water has been pre-heated to an acceptable temperature, and from where the water can be supplied to the first shower head under gravity for spraying on the body part.

The water-and-energy saving washing unit may include filters for separating solids from the recycling water, and manual, alternatively, fully automated control mechanisms.

The water-and-energy saving washing unit, alternatively, may be arranged in the form of an animal washing shower, a hair wash basin, a hand basin or the like, the first and the second washing sub-assemblies as well as the spout being arranged and selected correspondingly for washing such animals, hair, hands or the like.

The first and the third water reservoir and its corresponding water heater may comprise an electric geyser with a water capacity of about 1 and 10 litres and, preferably, between 2 and 5 litres. The second water reservoir may have a water capacity of between 1 and 10 litres and, preferably, between 2 and 5 litres. The predetermined volume of water in the second water reservoir may be between 1 and 10 litres, preferably, between 2 and 5 litres, and most preferably, about 3 litres.

According to a second aspect of the invention there is provided a kit for a passive water-and-energy saving washing unit, the washing unit being substantially as described hereinabove.

According to a third aspect of the invention there is provided a passive water-and-energy saving method for washing at least part of body with a washing unit, having a first washing sub-assembly, comprising a first water reservoir, for holding a predetermined volume of water for washing a body part, a water heating element, for heating water for the first water reservoir, a first spout, in fluid communication with the first water reservoir for receiving water from the reservoir and providing water to the body part; a second washing sub-assembly, comprising a second water reservoir, for collecting the water discharged from the spout, a second spout, in fluid communication with the second water reservoir for receiving water from the reservoir and providing washing water to the body part, a water pump, for pumping the water from the second water reservoir to the second spout; and a control arrangement, for controlling firstly, the water flow between the first water reservoir and the first spout, and secondly, the water flow between the second water reservoir and the second spout, with the assistance of the pump, once the second water reservoir has collected a predetermined volume of water therein, the method including the steps of:

allowing water to flow from the first water reservoir to the first spout, from where the water is being provided to the body part to be washed;

once the second water reservoir has collected the predetermined volume of water therein, terminating the water flow between the first water reservoir and the first spout;

pumping the water from the second water reservoir to the second spout, from where the water is being provided to the human body; and collecting the run-off water is collected again in the second water reservoir.

The method may include the steps, once the body part has been washed sufficiently or until the water temperature has dropped to below a predetermined or acceptable temperature, of:

terminating the pumping of the water from the second water reservoir to the second spout; and discharging the water from the second water reservoir, thereby terminating the washing process.

Alternatively, the method may include the steps, once the body part has been washed sufficiently or until the water temperature has dropped to below a predetermined or acceptable temperature, of:

terminating the pumping of the water from the second water reservoir to the second spout;

discharging the water from the second water reservoir; and repeating the steps of:

allowing fresh hot water to flow from the first water reservoir to the first spout, from where the water is being provided to the body part to be washed;

once the second water reservoir has collected the predetermined volume of water therein, terminating the water flow between the first water reservoir and the first spout;

pumping the water from the second water reservoir to the second spout, from where the water is being provided to the human body; and collecting the run-off water again in the second water reservoir.

The washing unit may be provided with a single (common) spout, shared jointly between the first washing sub-assembly and the second washing sub-assembly.

The washing unit may be arranged in the form of a human shower, the first and the second washing sub-assemblies being arranged in the form of a first and a second shower sub-assembly, with the spout being in the form of a shower head for spraying washing water onto a human body.

The washing unit, alternatively, may be arranged in the form of an animal washing shower, a hair wash basin, a hand basin or the like, the first and the second washing sub-assemblies as well as the spout being arranged and selected correspondingly for washing such animals, hair, hands or the like.

DETAILED DESCRIPTION OF THE INVENTION

Figure 2:
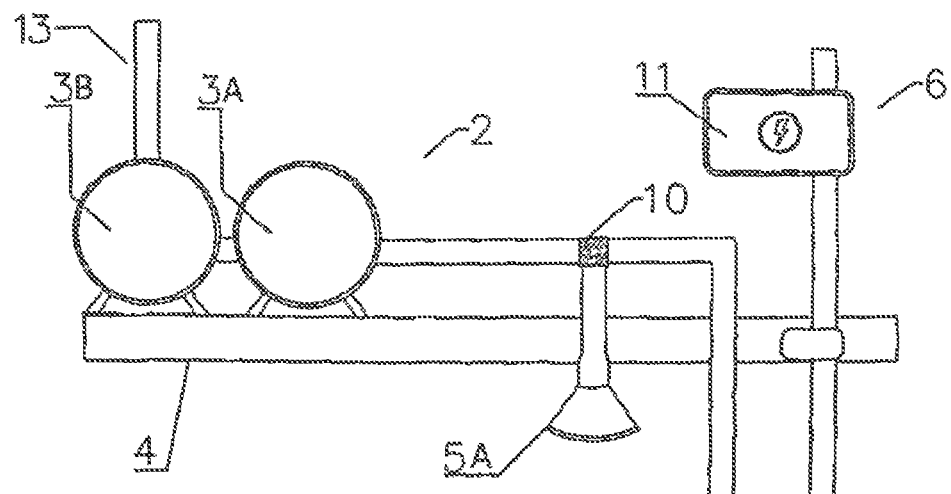
Figure 2:
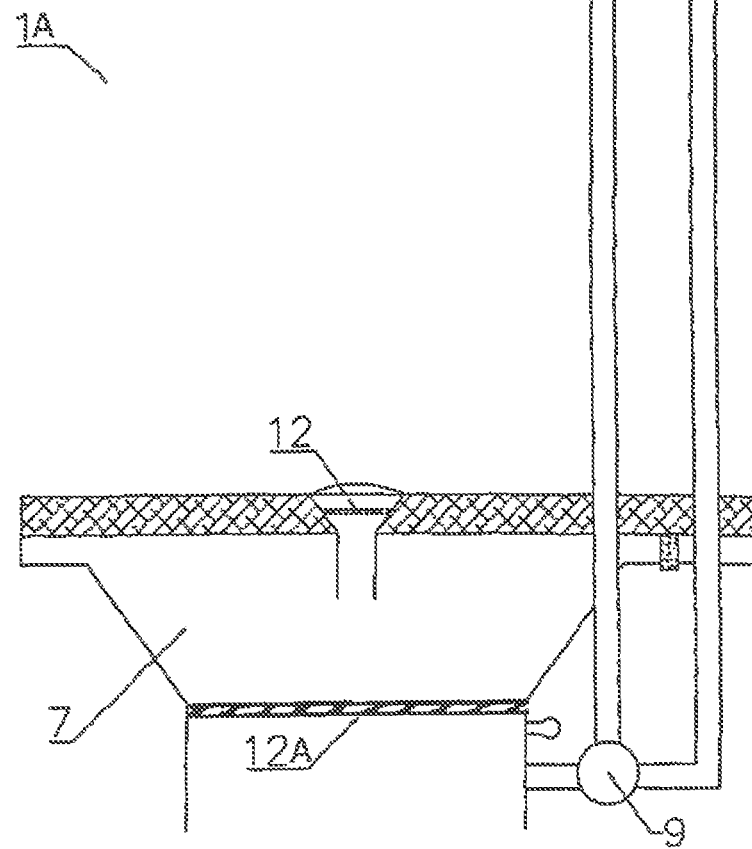

Preferred embodiments of the invention will now be described hereunder, with reference to the accompanying drawings, wherein:

FIG. 1 is a diagrammatic view of a passive water-and-energy saving washing unit in the format of a human shower, in accordance with the invention; and FIG. 2 is a diagrammatic view of an alternative embodiment of a passive water-and-energy saving washing unit in the format of a human shower, in accordance with the invention.

A passive water-and-energy saving washing unit 1 in the format of a human shower, as illustrated in FIG. 1, includes a first shower sub-assembly 2 and a second shower sub-assembly 6.

The first shower sub-assembly 2 comprises a first water reservoir 3, for holding a predetermined volume of clean (fresh) water for washing a human body (not shown), mounted on an elevated support structure 4, a water heating arrangement (not shown), for heating water for the first water reservoir, and a first shower head 5, in fluid communication with the first water reservoir for receiving water from the reservoir and providing water spray on the human body.

The second shower sub-assembly 6 comprises a second water reservoir 7, for collecting the spray (grey) water from the first shower head 5 and/or running off the human body (not shown), a second shower head 8, in fluid communication with the second water reservoir for receiving grey water from the second reservoir and providing water spray on the human body, and a water pump 9, for pumping the water from the second water reservoir to the second shower head.

The water-and-energy saving washing unit 1 further includes a first control mechanism 10, for controlling the water flow between the first water reservoir 3 and the first shower head 5, and a second control mechanism 11, for controlling the water flow between the second water reservoir 7 and the second shower head 8, with the assistance of the pump 9, once the second water reservoir has collected a predetermined volume of grey water therein.

The first water reservoir 3 and the water heater (not shown) is arranged in the form of an electric geyser with an internal element (not shown) of about 2 Kw and a water capacity of about 2 to 5 litres, set at a temperature of about 40 to 45° Celsius.

The water-and-energy saving washing unit 1 includes a filter 12 for separating solids from the recycling water.

The second water reservoir 7 has a water capacity of between 2 and 5 litres. The predetermined volume of water in the second water reservoir 7 is about 3 litres.

The water pump comprises a stainless steel water pump with an about 100 Watt motor.

The washing process comprises of a first washing cycle, with the use of clean (fresh) water in the first shower sub-assembly 2, and a second washing cycle, with the recycling of grey water through the second shower sub-assembly 6. The first washing cycle commences with the triggering of the first control mechanism 10, thereby allowing clean water to flow from the first water reservoir 3 to the first shower head 5, from where the water is sprayed onto the human body to be washed (not shown).

The first control mechanism 10 and the second control mechanism 11 are arranged such that once the second water reservoir 7 has collected the predetermined volume of grey water therein, the water flow between the first water reservoir 3 and the first shower head 5 is cut off, terminating the first washing cycle, and the pump 9 is triggered to commence the second washing cycle by pumping the grey water collected in the second water reservoir 7 to the second shower head 8, from where the grey water is sprayed onto the human body (not shown) and the run-off water is collected again in the second water reservoir.

It is envisaged that the second washing cycle can continue by operating the second shower sub-assembly 6, recycling the grey water within the second shower sub-assembly, comprising collecting the water sprayed from the second shower head 8 onto the human body (not shown) in the second water reservoir 7, pumping the collected, run-off water from the second water reservoir back to the second shower head, and re-spraying the grey water onto the human body (not shown), until the human body has been washed sufficiently or until the water temperature has dropped to below a predetermined or acceptable temperature. At this point, the second control mechanism 11 can be triggered to stop the pump 9 and allow the grey water to discharge from the second reservoir 7, thereby terminating the washing process.

Alternatively and once the grey water has been discharged from the second water reservoir 7, the first control mechanism 10 can be triggered to allow clean (fresh) hot water to flow from the first water reservoir 3 to the first shower head 5, until the second water reservoir 7 has collected the predetermined volume of the spray (grey) water from the first shower head and/or running off the human body therein, at which point the water flow between the first water reservoir 3 and the first shower head 5 is cut off again, and the pump 9 is triggered to pump grey water from the second water reservoir 7 to the second shower head 8, from where the grey water is sprayed onto the human body (not shown) and the run-off water is collected again in the second water reservoir.

An alternative embodiment of the passive water-and-energy saving washing unit 1A, in the format of a human shower, as illustrated in FIG. 2, similarly includes the first shower sub-assembly 2 and the second shower sub-assembly 6.

The washing unit 1A includes a first water reservoir 3A and a third water reservoir 3B, located and arranged in fluid communication with each other, the third water reservoir being located between a fresh water supply line 13 and the first reservoir, for holding a predetermined volume of clean (fresh) water for washing the human body (not shown), the third water reservoir being mounted similarly on the elevated support structure 4; a water heating arrangement (not shown), for heating water for the third water reservoir; and a single (common) shower head 5A, shared jointly between the first shower sub-assembly 2 and the second shower sub-assembly 6.

The third water reservoir 3B, with its water heating arrangement (not shown), preheats the water in the reservoir before supplying the pre-heated water to the first reservoir 3A, enabling the first reservoir to maintain the water temperature in it for a predetermined, extended period while providing a constant supply of predetermined heated water to the first shower head 5 from where clean water is sprayed onto the human body (not shown).

The third water reservoir 3B and its corresponding water heater (not shown) similarly comprise an electric geyser with a water capacity of about 2 to 5 litres, set at a temperature of about 40 to 45° Celsius.

The first control mechanism 10 of the water-and-energy saving washing unit 1A is located and arranged to control the water flow between the first water reservoir 3 and the joint shower head 5A as well as the water flow between the second water reservoir 7 and the joint shower head, with the assistance of the pump 9, by means of the second control mechanism 11.

The water-and-energy saving washing unit 1A includes a first filter 12 and a second filter 12A for separating solids from the recycling water.

It is further envisaged that the water-and-energy saving washing unit 1, as illustrated in FIG. 1, alternatively, the water-and-energy saving washing unit 1A, as illustrated in FIG. 2, could be modular, capable of being incorporated and arranged in a bank of substantially similar washing units. In these arrangements, it is envisaged that the third bulk water reservoir 3B and/or the first reservoir 3A could hold a predetermined volume of clean (fresh) bulk water for washing a plurality of human bodies (not shown), with a correspondingly dimensioned and arranged water heating arrangement (not shown), for heating a predetermined volume of clean (fresh) bulk water for the third water reservoir for washing such plurality of human bodies.

It is also envisaged that the washing unit 1 and/or 1A would be dimensioned and configured to reduce any cold or stagnant water pockets as far as reasonably possible so as to optimize the heat retention of the warm water. The distance between the third reservoir 3B and the first reservoir 3A, the distance between the first reservoir and the first shower head 5, alternatively the joint shower head 5A, the internal volumes of the shower heads 5, 8 and 5A, the volume of the second reservoir 7, the distance between the second reservoir and the pump 9, and the distance between the pump and the second shower head 8, alternatively the joint shower head 5A, are accordingly dimensioned and configured so as to reduce the distance of water flow and the internal volumes as far as reasonably possible. It is similarly envisaged that componentry and water conduits used in the washing units 1 and 1A would be selected from materials and/or be insulated as far as reasonably possible so as to reduce any heat loss and optimize the heat retention of the warm water while minimizing the build-up of biofilm therein for sanitary purposes.

It is further envisaged that the washing unit 1 and/or 1A would be a passive system, arranged to heat up ambient water in the first water reservoir 3, alternatively in the first reservoir 3A and the third reservoir 3B, immediately prior to washing only, so as to minimize the energy required to heat the water, rather than active systems, such as conventional washing units wherein the geysers are commonly arranged to retain the water at preselected temperatures in anticipation of potential future usage. In this regard, it is envisaged that the washing unit 1 and/or 1A could include an adjustable timer and/or thermostat setting mechanism (not shown) as part of the second control mechanism 11 for controlling and/or adjusting the heating time and/or temperature of the water in the first water reservoir 3, alternatively in the first reservoir 3A and the third reservoir 3B, and hence the temperature and/or duration of the washing process, as required from time to time.

It is also envisaged that the washing unit 1 and/or 1A could include a water quality sensor, such as for water colour, soapiness, water hardness and the like (not shown) as part of the second control mechanism 11 for controlling and/or adjusting the washing process, as required from time to time.

It is however envisaged that, as a further, simplified alternative arrangement, the water-and-energy saving washing unit 1, as illustrated in FIG. 1, could comprise a simple manual arrangement, wherein the first water reservoir 3 is merely a vessel being elevated to hold a predetermined volume of clean (fresh) water for washing a human body (not shown), batch-wise, once the water has been pre-heated to an acceptable temperature, and wherein the water heating arrangement (not shown) is separately and apart from the washing unit, capable of heating the water for the first water reservoir, and from where the water can be supplied to the first shower head 5 under gravity for spraying on the human body (not shown).

It will be appreciated that many variations in detail are possible without departing from the scope and/or spirit of the inventions as defined in the consistory statements hereinabove and/or as claimed in the claims hereinafter, such as a water-and-energy saving washing unit in the format of a camping shower unit, an animal washing unit, a hair wash basin, such as those used at hair solons, a hand basin or the like; manual or fully automated control mechanisms; different predetermined volumes and temperatures; reservoir volumes; suitably configured spouts, and the like.

The invention claimed is:

1. A passive water-and-energy saving washing unit comprising:
 a first washing sub-assembly comprising a first, fresh water reservoir, for holding a predetermined volume of fresh water for washing at least part of a body; a water heater for preheating water for the first water reservoir batch-wise prior to washing; and a first spout, in fluid communication with the first water reservoir for receiving fresh water from the first water reservoir and providing such washing water to the body part;
 a second washing sub-assembly, comprising a second, grey water reservoir for collecting discharged water and isolating the discharged water from at least the fresh water reservoir of the first washing sub-assembly; a second spout in fluid communication with the second, grey water reservoir for receiving grey water from the grey water reservoir and providing grey water to the body part; and a water pump for pumping the grey water from the second, grey water reservoir to the second spout; and further comprising a first control mechanism for controlling the fresh water flow between the first, fresh water reservoir and the first spout, and a second control mechanism for controlling the grey water flow between the second, grey water reservoir and the second spout, with the assistance of the pump once the second water reservoir has collected a predetermined volume of grey water therein, wherein the second control mechanism further comprises an adjustable timer and thermostat setting mechanism for controlling and adjusting the heating time and temperature of the fresh water in at least the first, fresh water reservoir.

2. The washing unit as claimed in claim 1 characterised as being arranged in the form of a human shower, the first and the second washing sub-assemblies being arranged in the form of a first and a second shower sub-assembly, wherein the first shower sub-assembly has the first spout in the form of a first shower head, and the second shower sub-assembly has the second spout, in the form of a second shower head, and wherein the first, fresh water reservoir has a water capacity of between 1 and 10 litres and the water heater is set for preheating the fresh water at temperatures of about 40 to 45° Celsius.

3. The washing unit as claimed in claim 1 wherein the first control mechanism and the second control mechanism are arranged such that once the second, grey water reservoir has collected the predetermined volume of grey water therein, the fresh water flow between the first, fresh water reservoir and the first spout is cut off and the pump is triggered to pump water from the second, grey water reservoir to the second spout, from where the grey water can be sprayed onto the body part and the run-off grey water can be collected again in the second water reservoir.

4. The washing unit as claimed in claim 1 wherein the first control mechanism and the second control mechanism are arranged such that once the body part has been washed or once the grey water temperature has dropped to below a predetermined temperature, the second control mechanism can be triggered to stop the water pump and allow the grey water to discharge from the second, grey water reservoir.

5. The washing unit as claimed in claim 1 wherein the first control mechanism and the second control mechanism are arranged such that once the grey water has been discharged from the second, grey water reservoir, the first control mechanism can be triggered to allow fresh hot water to flow from the first, fresh water reservoir to the first spout, from where it can be sprayed onto the body part and the run-off grey water can be collected in the second water reservoir.

6. The washing unit as claimed in claim 5 wherein the first control mechanism and the second control mechanism are further arranged such that once the second, grey water reservoir has collected the predetermined volume of grey water therein, the fresh water flow between the first, fresh water reservoir and the first spout is cut off and the pump is triggered to pump grey water from the second, grey water reservoir to the second spout, from where the grey water can be sprayed onto the body part and the run-off grey water can be collected in the second water reservoir.

7. The washing unit as claimed in claim 1, further comprising a third, fresh water reservoir, arranged in fluid communication between a fresh water supply line and the first, fresh water reservoir, for holding a predetermined volume of fresh water for washing the human body, wherein the third water reservoir is mounted on an elevated support structure; and a second water heater for heating fresh water for the third water reservoir.

8. The washing unit as claimed in claim 7 wherein the third, fresh water reservoir preheats the water in the third water reservoir batch-wise prior to washing before supplying the pre-heated fresh water to the first, fresh water reservoir, wherein the first reservoir maintains the water temperature for a predetermined period while providing a constant supply of fresh, heated water to the first spout from where fresh water is sprayed onto the human body.

9. The washing unit as claimed in claim 1 wherein the first control mechanism of the washing unit is operatively located and arranged to control the fresh water flow between the first, fresh water reservoir and the first spout as well as the grey water flow between the second, grey water reservoir and the second spout, with the assistance of the pump and the second control mechanism.

10. The washing unit as claimed in claim 1 dimensioned and configured to minimize cold and stagnant water pockets and reduce the distance of water flow and internal volumes so as to reduce any heat loss and optimize the heat retention of the warm water while minimizing the build-up of biofilm therein for sanitary purposes.

11. The washing unit as claimed in claim 1 further comprising a water quality sensor as part of the second control mechanism for controlling and/or adjusting the washing process and at least one filter for separating solids from the grey water.

12. The washing unit as claimed in claim 1 wherein the first washing sub-assembly comprises a manual arrangement comprising a vessel elevated to hold a volume of fresh water, once the water has been pre-heated to an acceptable temperature, from where the fresh water can be supplied to the first spout under gravity.

13. The washing unit as claimed in claim 1 wherein each of the first, fresh water reservoir and the second, grey water reservoir has water capacities of between 1 and 10 litres.

14. A kit for a passive water-and-energy saving washing unit wherein the kit comprises the passive water-and-energy saving washing unit of claim 1.

15. A passive water-and-energy saving method for washing at least part of body with a washing unit, comprising a first washing sub-assembly, comprising a first, fresh water reservoir, for holding a predetermined volume of fresh water for washing at least part of a body part, a water heating element, for preheating water batch-wise prior to washing for the first water reservoir, and a first spout, in fluid communication with the first water reservoir for receiving water from the reservoir and providing fresh water to the body part; a second washing sub-assembly, comprising a second, grey water reservoir, for collecting grey water and isolating the discharged water from the first washing sub-assembly, a second spout, in fluid communication with the second, grey water reservoir for receiving grey water from the second, grey water reservoir and providing water to the body part, and a water pump, for pumping the grey water from the second, grey water reservoir to the second spout; and further comprising a first control mechanism for controlling the fresh water flow between the first, fresh water reservoir and the first spout, and a second control mechanism for controlling the grey water flow between the second, grey water reservoir and the second spout, with the assistance of the pump once the second water reservoir has collected a predetermined volume of grey water therein, wherein the second control mechanism further comprises an adjustable timer and thermostat setting mechanism for controlling and adjusting the heating time and temperature of the fresh water in at least the first, fresh water reservoir the method including the steps of:

allowing fresh water to flow from the first, fresh water reservoir to the first spout, from where the water is discharged to the body part to be washed;

once the second, grey water reservoir has collected the predetermined volume of grey water therein, terminating the fresh water flow between the first, fresh water reservoir and the first spout;

pumping the grey water from the second, grey water reservoir to the second spout, from where the water is being provided to the human body; and collecting the run-off grey water in the second water reservoir.

16. The method as claimed in claim 15 further comprising terminating the pumping of the grey water from the second, grey water reservoir to the second spout once the water temperature has dropped to below a predetermined temperature; and discharging the grey water from the second water reservoir.

17. The method as claimed in claim 15 further comprising terminating the pumping of the grey water from the second, grey water reservoir to the second spout once the water temperature has dropped to below a predetermined temperature;

discharging the grey water from the second water reservoir; and repeating the steps of:

allowing fresh hot water to flow from the first, fresh water reservoir to the first spout, once the second water reservoir has collected the predetermined volume of grey water therein, terminating the fresh water flow between the first water reservoir and the first spout;

pumping the grey water from the second water reservoir to the second spout, and collecting the run-off grey water again in the second water reservoir.

\* \* \* \* \*